Oct. 28, 1958 R. T. MASSENGILL 2,857,619
APPARATUS FOR PREPARING HAMS
Filed Jan. 12, 1956 2 Sheets-Sheet 2
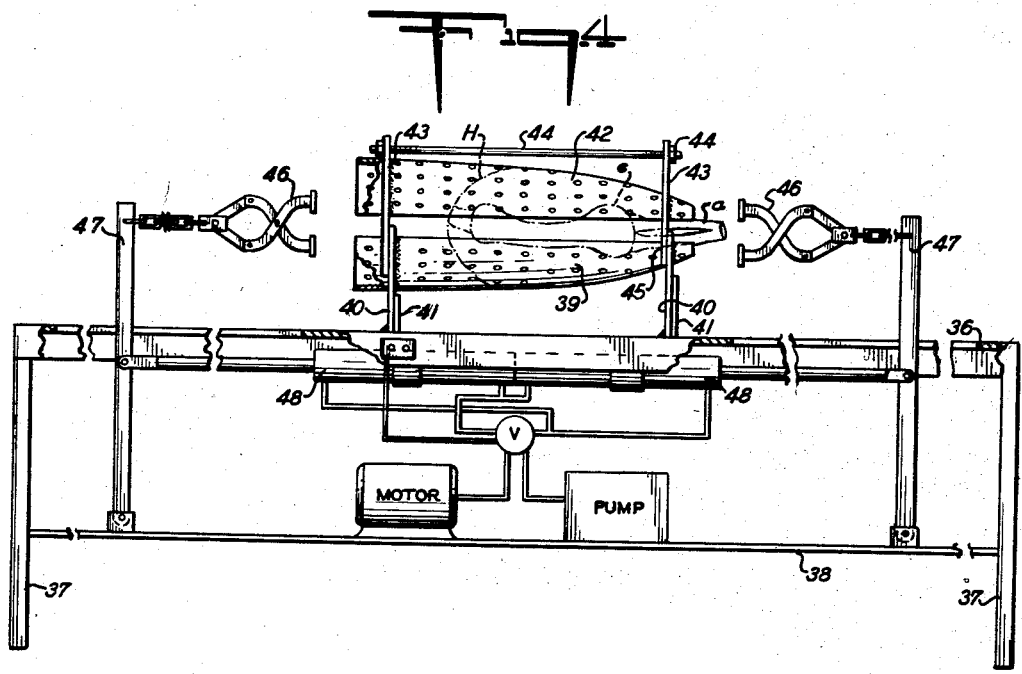
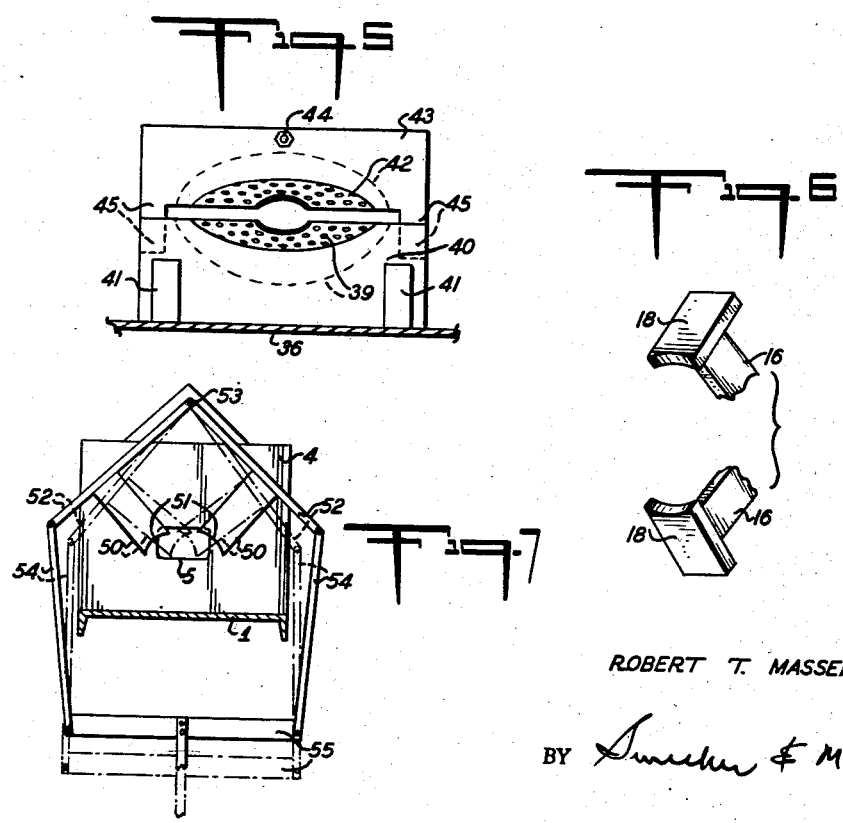
INVENTOR
ROBERT T. MASSENGILL
BY
ATTORNEYS

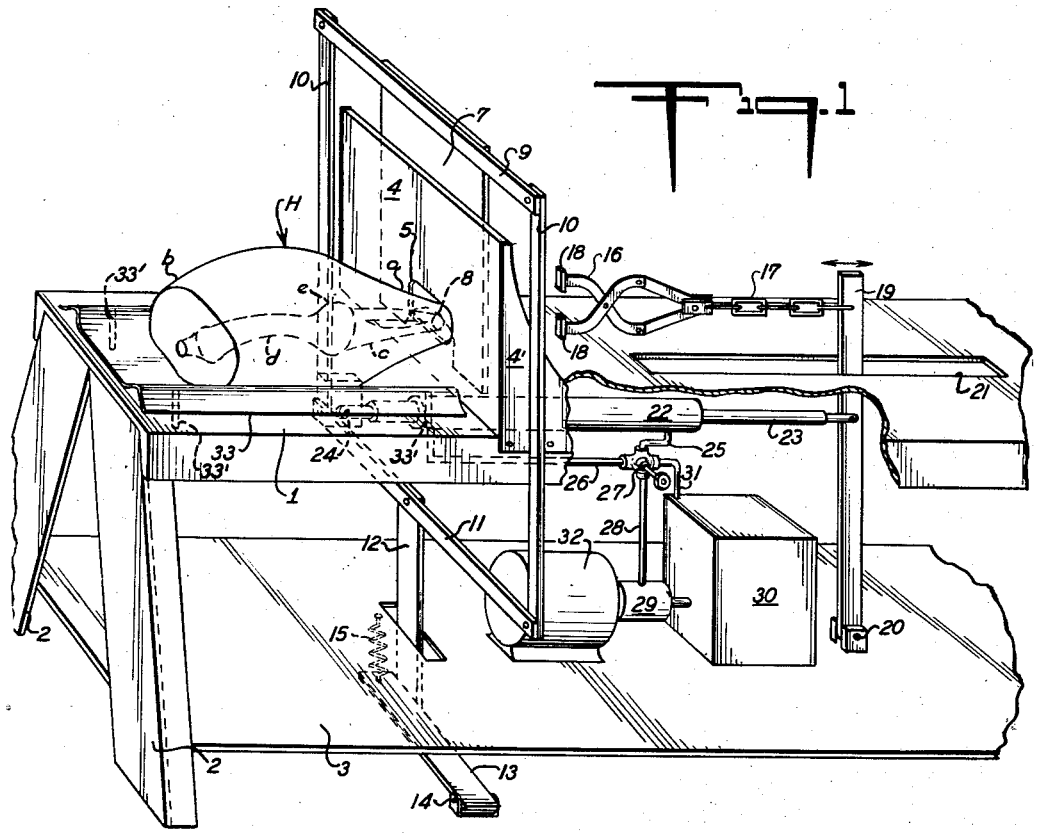
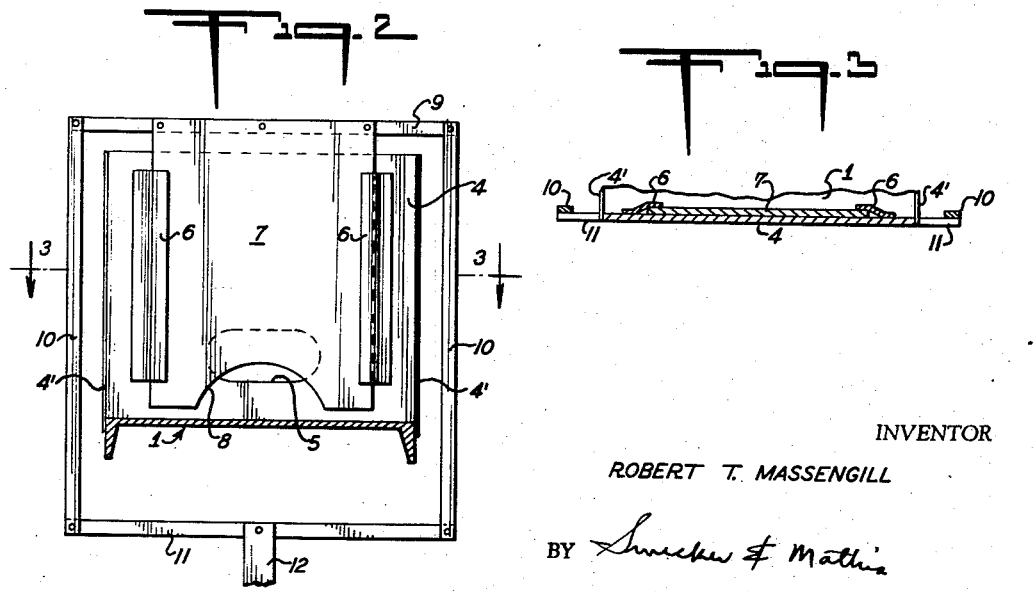

United States Patent Office 2,857,619
Patented Oct. 28, 1958

2,857,619

APPARATUS FOR PREPARING HAMS

Robert T. Massengill, Chicago, Ill.

Application January 12, 1956, Serial No. 558,674

7 Claims. (Cl. 17—1)

This invention relates to improvements in apparatus for preparing hams.

It has been the practice heretofore in curing hams to apply the curing material to the outside surface of the ham, either by soaking, salting or otherwise, but this takes a long period of time for complete penetration of the curing material through the thick portion of the ham so as to obtain an effective curing thereof. Moreover, the bone which extends through the center of the ham is subject to attack, especially when the ham is not effectively cured throughout and interferes with the complete curing process.

No satisfactory means has been proposed heretofore for the removal of the bone before curing. In some instances, butchers have occasionally boned a ham by the act of splitting the ham lengthwise down to the bone and cutting away the bone from the cured meat surrounding it, after which the meat of the ham is drawn together and tied with strings. This is highly objectionable because it is not only unsightly, but leaves a ragged side to the complete ham, and yet it has been the only way known heretofore for the effective removal of the bone.

One object of this invention is to improve the preparation of hams by the lengthwise removal of the bones therefrom through a pulling action applied to the bones at the ends thereof, preferably before curing of the hams.

Another object of the invention is to remove the bone from a ham in a lengthwise direction without disturbing or cutting into the outside surface of the ham, but allowing the latter to remain whole.

Still another object of the invention is to improve the treatment of the ham for preparation and/or preserving thereof by introducing into the center of the ham, after removal of the bone, a filling or treating material that will materially improve the palatability or preservation of the ham.

These objects may be accomplished, according to certain embodiments of the invention, by holding the ham in a suitable cradle and applying a pulling force to one or both opposite ends of the ham bone to separate the bone lengthwise from the meat of the ham. Power means may be used for applying the pulling force acting through a suitable grab or clamp that may be attached to either end of the ham bone for separation and removal of the bone from the meat of the ham.

Thereafter, in the event that the ham has not been cured, a curing material may be applied both externally and internally of the ham, as desired, and acting through the inner wall thereof, will accomplish an effective curing action much more quickly and effectively than a curing applied only to the outside surface thereof.

These embodiments of the invention are illustrated in the accompanying drawings, in which:

Fig. 1 is a perspective view of one form of ham treating device with parts broken away;

Fig. 2 is a partial vertical cross section therethrough rearwardly of the ham-engaging abutment;

Fig. 3 is a cross section through the ham holding device on the line 3—3 in Fig. 2;

Fig. 4 is a side elevation showing a modified form of pulling device with parts broken away;

Fig. 5 is a partial vertical cross section therethrough rearwardly of the ham-engaging means;

Fig. 6 is a detail perspective view of a portion of the bone grab or clamp; and

Fig. 7 is a vertical cross section through a platform, showing a further modification of the holding plates.

The invention is shown as applied to a conventional ham, generally indicated at H, which has a reduced hock end at $a$ and a butt end $b$ constituting the large fat area of the ham. These respective portions thereof have a main bone extending through the ham, with sections $c$ and $d$, respectively, joined together at a knee joint $e$. A blade bone is usually attached at the free end of the bone section $d$, but this is of relatively small size and short, and very often it can be removed readily in preparing the ham for treatment.

While the invention is described in connection with a ham that is generally the hind quarter of a hog, it is also contemplated that there may be included therein the shoulder or forequarter of the hog or similar parts of other animals, beef for example. Generally, however, it is more uniformly applicable to the conventional hams.

The device illustrated in Figs. 1 to 3 comprises a platform 1 mounted on suitable supports or legs, generally indicated at 2 and located preferably at opposite ends of the platform 1. It is preferred that the legs be of sufficient length so as to hold the platform at a convenient height for the operator, such as the elevation of a conventional table. A shelf 3 is shown as extending lengthwise between the legs 2 at opposite ends of the device, not only for bracing the legs, but also for supporting some of the operating parts.

Mounted upon the platform 1 intermediate the length thereof and secured rigidly to the platform, as shown in Figs. 2 and 3, is an upstanding plate or abutment 4. Braces 4' are connected with opposite ends of the support or plate 4 and with the opposite edges of the platform 1 to hold the plate securely in upstanding position on the platform. This plate or support 4 has an opening 5 at or adjacent the lower end thereof and may be open to the surface of the platform 1 or spaced somewhat above the surface thereof, as shown in Fig. 2. The plate or support 4 carries a pair of guides 6 transversely spaced on opposite sides of the opening 5.

Slidably mounted between the guides 6 is a coacting member 7 which has a notch 8 in its lower end overlapping the opening 5 to receive a portion of the ham, such, for example, as one of the bone sections. The slide member 7 is adapted to be raised and lowered for increasing or reducing the size of the opening formed by the complementary portions 5 and 8.

To provide for such raising and lowering movement, the upper end of the slide member 7 has a crossbar 9 secured thereto and extending transversely over the platform 1 spaced above the latter. At the opposite ends of the crossbar 9 and pivotally connected therewith are upwardly extending links 10 that project downwardly on opposite sides of the platform, being connected together at their lower ends by a crossbar 11. The crossbar 11 is also pivotally connected with the links 10, whereby this structure provides for self-aligning of the movable plate or slide member 7 to assure of free action of the latter.

The crossbar 11 has a link 12 connected therewith intermediate its ends and extending downward to a foot pedal 13 with which it is pivotally connected. The foot pedal 13 may be suspended freely on the link 12 or pivotally mounted on the floor, as indicated at 14. A spring 15 should be connected with the link 12, as between the pedal 13 and the shelf 3, to constitute suitable means for raising the sliding frame and movable plate 7, as desired.

A grab or clamp is indicated generally at 16, which preferably is of the type that applies increasing pressure as a pull is exerted thereon. In the form illustrated, this comprises a pair of crossed members connected at one end with a flexible device 17 and having fingers 18 on the opposite ends thereof, with concave inner faces or edges in positions to embrace a ham bone. The grab or clamp 16 may be engaged with one end of the bone, and upon outward pulling action by the flexible device 17, will extract the bone from the ham.

This pulling action may be accomplished, according to this embodiment of the invention, by a lever 19 connected with one end of the flexible device 17. The opposite end of the lever 19 is pivotally supported at 20 in a suitable position for swinging movement through a slot 21 in the platform 1.

Intermediate the length of the lever 19, it is connected with a power device for manipulating the lever. In this form of the invention, the power device comprises a hydraulic cylinder, generally designated at 22, and having a piston rod 23 connected with a piston therein and with the lever 19 intermediate the length of the latter. The cylinder 22 is pivotally supported at its opposite end at 24 on the under side of the platform 1.

The hydraulic power device should preferably be of the double-acting type, with connections 25 and 26 extending to the opposite ends thereof from a suitable 4-way valve 27 adapted to be controlled by the operator for obtaining the proper and desired operation of the device.

The valve 27 has a connection 28 with a pump 29 connected at one side of a tank 30, which tank also has a return bypass 31 from the valve 27. The pump 29 may be operated by an electric motor 32 or other suitable power means.

Mounted upon the platform 1 is a cradle, generally indicated at 33, which may comprise a transversely curved pan, either seated loosely on the platform or detachably secured thereto by pins 33' engaging in selected openings in the platform, for supporting the ham H thereon during extraction of the bone.

In the operation of this form of device, according to the process of this invention, the ham is placed in the cradle 33 on the platform 1 with the hock end thereof toward the opening 5. The blade or aitch bone that is often attached to the main bone d may be removed by the operator in preparing the ham for treatment, and the bone c should be projected through the openings 5 and 8 sufficiently for engagement of opposite sides of the bone c by the fingers 18 on the grab or clamp 16.

Then, upon operation of the hydraulic power device 22 by proper control of the valve 27, the lever 19 will swing to the right in Fig. 1 to apply a pulling action to the grab or clamp 16 acting on the bone c. The holding of the clamp on the bone will increase as the pull increases, so as to eliminate any possibility of disengagement of the clamp therefrom. The meat or body of the ham will be held back by the upright plate 4 as the bone of the ham will be withdrawn through the aligned openings 5 and 8 by the action of the clamp 16.

Normally, the entire length of bone comprising both sections c and d may be withdrawn readily from the body of the ham by the action of the clamp. However, if the sections c and d should become separated in the extraction of the bone, due to breakage of the socket e or otherwise, the ham may be reversed in position and the section d of the butt end may be extended through the openings 5 and 8 and engaged by the clamp 16 so as to withdraw it likewise.

Normally, the removal of the bone should be accomplished before the ham is cured, although the bone may be removed from a cured ham, if desired. This enables the ham to be treated more readily, both for preserving and for palatability. For example, the preservative then may be applied both externally and internally of the ham in the usual manner of applying salt, brine, or other suitable treating materials. For example, the inside of the ham after removal of the bone, may be packed with curing salt so as to effect the curing treatment from the inside out, which thereby completely effects a curing action to the ham more quickly and more effectively than is possible when the ham is treated with the bone in place. Moreover, it completely excludes the possibility of attack by insects, as often encountered when the ham is ineffectively cured with the bone in place.

The effective removal of the bone leaves an open cavity in the ham which makes it extremely desirable for use in new methods of treatment. For example, the cavity may be filled with foodstuffs to provide a desirable stuffed ham, while leaving the entire outer surface thereof free of blemishes and without any tying or confining in the manner of conventional boned hams.

A modified form of the invention is illustrated in Figs. 4 and 5, which involves the application of a pulling force in opposite directions to the respective bone sections c and d, while the body of the ham is held in place by a suitable cradle or device over the platform. In this modified form, the platform is indicated generally at 36, and is supported by upright legs 37 at opposite ends thereof, with a shelf 38 extending in bridging relation between the legs 37.

Mounted over the platform 36 is a cradle 39 which is perforated for the draining of juices therethrough, as well as curved to conform generally to the shape of the ham. The cradle 39 is supported by plates 40 at opposite ends thereof, secured rigidly upon the platform 36. Braces are shown at 41.

A cover is shown at 42 extending over the cradle 39 and preferably formed in like manner complementary to the cradle, coacting therewith to enclose a ham therebetween, with the hock end of the ham projecting through the opening at the smaller righthand end of the combined cradle and cover, as illustrated in Fig. 4. It will be observed that the curvature of the cradle 39 and the curvature of the cover 42 provide abutments which will prevent movement of the meat of the ham to the right, as viewed in Fig. 4. The cover 42 is carried by plates 43, preferably braced by one or more tie rods extending therebetween and indicated at 44. Arms 45 on the plates 43 extend downward in overlapping relation, with the upper edge portions of the plates 40 to confine the cover 42 against endwise displacement during the extraction of the bone from the ham. Any suitable means may be provided for securing the cover in place on the cradle and for clamping the ham therebetween.

With this form of device, it is preferred that both opposed ends of the bone be engaged for removal of the sections endwise upon separation at the joint e. Accordingly, I have provided a pair of clamps or grabs, generally indicated at 46, which may be of the character described above and illustrated in Fig. 6, or of other suitable form capable of secure connection with the bone sections of the ham. Levers 47 are connected with the grabs 46 in the manner described. These levers 47 are shown as operated jointly in opposite directions by hydraulic power devices 48. The hydraulic system for the respective power devices is conventional and well known in the art of hydraulics and need not be described in detail, as is true also in Fig. 1 with respect to the single cylinder there provided.

The grabs or clamps may be operated in other suitable ways as, for example, by other types of power devices, such as air operated devices, electric motors, etc. However, it is preferable that the power operated devices should impart thereto the required action that will effectively remove the bone or bone sections, as the case may be, from the meat of the ham, while the latter is retained in place in the cradle or on the platform.

A further modification is disclosed in Fig. 7 of the holding plates for the ham. In this form, the platform 1 has the usual upstanding plate or abutment 4, with an opening 5 therein for passage of the bone of the ham or tongs therethrough, as described above. Provision is made in cooperation with the plate and opening therein for retaining the meat against passage through the plate. In this form, the retaining means comprises a pair of sliding plates 50, each of which has a notched inner end 51 corresponding in shape generally to the peripheral shape of the opening 5.

The sliding plates 50 are carried, respectively, by levers 52 pivotally mounted at 53 on the upstanding plate 4. Links 54 are pivotally connected with the levers 52 and extend downwardly therefrom to a crossbar 55 corresponding with the crossbar 11 shown in Fig. 1. In other respects, this form of device operates in the same manner described above. Any suitable number of sliding plates 50 may be used as found desirable or necessary, as, for instance, three, four, etc.

The process of treating a ham, either for preservation or in preparation for eating, makes it possible to improve appreciably the palatability of the ham, its preservation and other desirable properties. The bone may be removed effectively and easily in a very simple manner without affecting appreciably the external appearance of the ham around the sides thereof, which does not require either the disfiguring of the ham or the tying of it in the manner of providing boned hams heretofore. The small opening provided at the end, either after the removal of the hitch bone or after removal of the main ham bone, will not be objectionable, due to the relatively small size thereof, and may, in fact, add appreciably to the use of the ham, inasmuch as it is possible to introduce stuffing therein, especially when the ham is baked.

While the invention has been illustrated and described in certain embodiments, it is recognized that other variations and changes may be made therein without departing from the invention as set forth in the claims.

I claim:

1. Ham treating apparatus comprising a platform, a cradle mounted on the platform in position to receive a ham therein in prone position with the bone of the ham exposed at one end of the latter, an upstanding plate on the platform adjacent one end of the cradle with an opening therein through which the end of the bone may be projected, means slidably mounted with respect to the plate and cooperating with the cradle for confining the body of the ham, a grab device in position to engage the exposed end of the bone, and means connected with the grab device for applying an outward pull thereto for extracting the bone from the body of the ham.

2. Ham treating apparatus comprising a platform, an upright plate mounted on the platform and having an opening thereto, guide means on said plate, a movable plate slidably mounted in the guide means for raising and lowering movement with respect to the platform and having an opening therein in position to coact with the first-mentioned plate for projecting a ham bone therethrough, a cradle mounted on the platform on one side of the plates in position to receive the ham in prone position, means operatively connected with the movable plate for raising and lowering the latter with respect to the platform, a grab device on the opposite side of the plates from the cradle, and means connected with the grab device for moving the latter outward away from the cradle to extract the bone from the body of the ham.

3. Ham treating apparatus comprising a platform, an upright plate mounted on the platform and having an opening thereto, guide means on said plate, a movable plate slidably mounted in the guide means for raising and lowering movement with respect to the platform and having an opening therein in position to coact with the first-mentioned plate for projecting a ham bone therethrough, a cradle mounted on the platform on one side of the plates in position to receive the ham in prone position, means operatively connected with the movable plate for raising and lowering the latter with respect to the platform, a grab device on the opposite side of the plates from the cradle, a lever connected with the grab device, and a hydraulic power device connected with the lever for operating the lever to move the latter and the grab device in an outward direction.

4. Apparatus for removing the bone from a ham comprising a stationary plate having an opening therein through which an end of the bone of the ham may be projected, means slidably mounted with respect to said plate and cooperating with said opening to prevent passage of the body of the ham through said opening, a grab device in position to engage the end of the bone projected through said opening, and means connected with the grab device for applying an outward pull thereto for extracting the bone from the body of the ham.

5. Ham treating apparatus comprising means having an opening therein for supporting a ham in prone position with a portion of the bone of the ham protruding through said opening, said means including a member having an abutment thereon adjacent said opening for engaging the meat adjacent the bone of the ham to prevent movement of the meat through said opening, bone-engaging means operatively associated with said abutment for engaging the protruding portion of the bone, and means connected to said bone-engaging means for moving said bone-engaging means away from said abutment in the direction opposite from said meat to extract the bone from the ham through said opening.

6. Ham treating apparatus comprising means having an opening therein for supporting a ham in prone position with a portion of the bone of the ham protruding through said opening, said means including a member having an abutment thereon adjacent said opening for engaging the meat adjacent the bone of the ham to prevent movement of the meat through said opening, a grab device operatively associated with said abutment for engaging the protruding portion of the bone, and power means connected to said grab device for moving said grab device away from said abutment in the direction opposite from said meat to extract the bone from the ham through said opening.

7. Ham treating apparatus comprising means having an opening therein for supporting a ham in prone position with a portion of the bone of the ham protruding through said opening, said means including a cradle and a cover member cooperating with said cradle to confine the ham in the cradle, said cradle and said cover member being spaced apart at one end thereof to define said opening and having abutments thereon adjacent said opening for engaging the meat adjacent the bone of the ham to prevent movement of the meat through said opening, bone-engaging means operatively associated with said abutments for engaging the protruding portion of the bone, and means connected to said bone-engaging means for moving said bone-engaging means away from said abutments in the direction opposite from said meat to extract the bone from the ham through said opening.

References Cited in the file of this patent

UNITED STATES PATENTS

| | | |
|---|---|---|
| 954,084 | Gelbman | Apr. 5, 1910 |
| 1,435,877 | Reubold | Nov. 14, 1922 |
| 1,519,296 | Davis et al. | Dec. 16, 1924 |
| 2,227,738 | Oswald et al. | Jan. 7, 1941 |
| 2,493,707 | Weber | Jan. 3, 1950 |
| 2,553,113 | Ruggiero | May 15, 1951 |
| 2,587,967 | Coad | Mar. 4, 1952 |